(12) United States Patent
Gilbert

(10) Patent No.: US 9,775,272 B1
(45) Date of Patent: Oct. 3, 2017

(54) AUXILIARY HANDLE ATTACHMENT FOR A MATERIAL-MOVING TOOL

(71) Applicant: John S. Gilbert, Somers, NY (US)

(72) Inventor: John S. Gilbert, Somers, NY (US)

(*) Notice: Subject to any disclaimer, the term of this patent is extended or adjusted under 35 U.S.C. 154(b) by 0 days.

(21) Appl. No.: 15/337,388

(22) Filed: Oct. 28, 2016

Related U.S. Application Data

(60) Provisional application No. 62/385,450, filed on Sep. 9, 2016.

(51) Int. Cl.
*A01B 1/02* (2006.01)

(52) U.S. Cl.
CPC .................................. *A01B 1/026* (2013.01)

(58) Field of Classification Search
CPC .. A01B 1/026; A01B 1/02; B25G 1/00; A01L 31/02; B25F 5/024; B25F 5/025
USPC ................................ 294/58, 57, 178; 16/426
See application file for complete search history.

(56) References Cited

U.S. PATENT DOCUMENTS

| | | | |
|---|---|---|---|
| 715,056 A | 12/1902 | Gruner | |
| 2,614,879 A * | 10/1952 | Citso | A01B 1/026 294/58 |
| 3,155,414 A * | 11/1964 | Bales | A01B 1/026 16/426 |
| 3,466,078 A * | 9/1969 | Sholund | A01B 1/22 16/426 |
| 5,474,350 A * | 12/1995 | Gauthier | A01B 1/00 16/426 |
| 6,283,522 B1 | 9/2001 | Renaud | |
| 6,464,272 B1 * | 10/2002 | Michaud | A01B 1/026 16/430 |
| 6,553,627 B1 * | 4/2003 | Horler | B25G 1/00 15/144.1 |
| 6,704,968 B2 * | 3/2004 | Lau | A01B 1/026 16/426 |
| 2008/0196205 A1 * | 8/2008 | Hixon | A01B 1/026 16/426 |

FOREIGN PATENT DOCUMENTS

| | | | |
|---|---|---|---|
| CA | 2154398 A1 * | 3/1997 | ............... A01B 1/00 |
| GB | 2371512 A | 7/2002 | |

* cited by examiner

*Primary Examiner* — Gabriela Puig
(74) *Attorney, Agent, or Firm* — Karl F. Milde, Jr.; Eckert Seamans Cherin & Mellott, LLC

(57) ABSTRACT

An auxiliary handle accessory attaches to a shovel's handle-shaft via a folding "clamshell" type clamp, with an intermediate stem member attached to the clamp, and a grip handle screwed into this intermediate stem member, completing the assembly. The intermediate stem member has a ball-knob at the bottom that becomes entirely enclosed by half-sphere "cups" in each of the clamshell clamp halves. When these clamshell-halves close together, they form a simple yet robust socket around the ball, and comprise a ball-and-socket joint. Advantageously, the clamshell-clamp halves are bolted together, insuring a strong and robust connection. This design accommodates the "to-and-fro" motion in the vertical axis during shoveling.

6 Claims, 6 Drawing Sheets

AUXILIARY HANDLE ATTACHMENT FOR A MATERIAL-MOVING TOOL

BACKGROUND OF THE INVENTION

The present invention concerns an auxiliary handle designed for attachment to a manually-operated, material-moving tool that requires two hands and two arms to use.

The present invention is primarily intended for use with long-handled implements, such as shovels for moving dirt, gravel or snow, and pitch-forks for moving hay, silage or manure, but it is also applicable for handling other heavy items such as pipes or fire hoses.

More particularly, the present invention concerns a device for relieving the stress and strain on a person's back, wrists and forearms that typically accompany the use of implements of this kind.

DESCRIPTION OF THE PRIOR ART

Common shovels and pitch-forks have proven to be very practical implements for moving material, but continual or repetitive use of such tools can be strenuous. While workers still use shovels and pitch-forks in the ordinary fashion, efforts have been expended to make their use less arduous. Auxiliary handles of various types have been attached to such tools to aid the user in lifting the shoveled material. Such auxiliary handles serve to improve the user's leverage and reduce the distance of reach when moving the material.

Examples of such auxiliary handles may be found in the U.S. Pat. Nos. 0,715,056 and 6,283,522 and in the U.K. Patent No. 2,371,512. The devices known from these patents achieve their intended purpose of relieving stress on the user, but they are not readily attached to the implement or adjusted in position, when attached, to suit the individual user.

SUMMARY OF THE INVENTION

Accordingly, it is a principal objective of the present invention to provide an auxiliary handle for a long-handled shovel or pitch-fork—i.e., an implement for manually moving material—that serves to reduce stress on the user's back, wrists and forearms.

It is a further objective to provide an auxiliary handle of this type which is easy to attach to an implement and practical to adjust for maximum convenience of the user.

These objectives, as well as other objectives which will become apparent from the discussion that follows, are achieved, according to the present invention, by providing an adjustable, auxiliary handle accessory which includes the following components:

(a) A removable clamping device, adapted to clamp tightly around the cylindrical shaft handle portion of a tool. The clamping device includes two substantially identical clamshell members hinged together at one end and having mating semi-circular sections designed to surround a shaft portion and clamp tightly together. The clamshell members each have a hemispherical indentation at their ends opposite the hinge that form a hollow sphere when the two members are held together in the clamped position. The clamping device further includes a releasable locking device for holding the clamshell members tightly together in the clamped position and for releasing the clamshell members for removal from the tool or for repositioning the accessory.

(b) A removable handle device having a spherical knob at one end designed to fit snugly inside the hollow sphere of the clamping device when its clamshell members are attached to the tool. The handle device has a gripping member at its opposite end designed to be gripped and manipulated by a user.

To use the auxiliary handle, the clamping device is applied and clamped to an implement, such as a shovel or pitch-fork, at an appropriate position, for example the lower part of the implement handle (preferably below the midway point). The user may wish to experiment a bit to find the position along the shovel handle that is most effective and convenient. To do this the clamping device is easily loosened, slid up or down the shaft and clamped again.

The two halves of the clamping device are preferably held together by at least one nut and bolt. Each bolt extends through a hole in the clamshell members when in the clamped position and a cooperating nut secures the bolt, squeezing the clamshell members tightly together.

In a preferred embodiment of the invention, the removable handle device is a two-part element which includes an intermediate stem member and a gripping member. The intermediate stem member comprises a rod with the spherical knob at one end for attachment to the clamping device when the clamshell members are clamped tightly together around the shaft portion of a tool. The intermediate member has a connecting element at its opposite end for attachment to the gripping member.

The gripping member, which has a handle that can be conveniently gripped by a user, has a cooperating connecting element for attachment to the intermediate stem member. The connecting elements on the intermediate member and the gripping member preferably include a threaded opening, in either one of the intermediate member or the gripping member, and a threaded stud, in the other of the intermediate member and gripping member, adapted to screw into the threaded opening.

The gripping member is preferably a round rod with a central axis which is rotatably coupled to the intermediate member in such a way as to permit angular movement about an axis transverse to this central axis. This allows its orientation to be adjusted for maximum convenience of the user.

In a particularly advantageous embodiment of the auxiliary handle accessory according to the invention, the hollow sphere formed by the clamshell members includes a groove, and the spherical knob of the removable handle device has an extending stud, designed to fit within the groove. The groove and the extending stud cooperate together to limit the freedom of movement of the handle device. This enables the user to control the tool by applying forces in desired directions.

In a further preferred embodiment of the invention the intermediate stem member is made adjustable in length. Alternatively, several such members of differing lengths may be provided for selection by the user. In this way the intermediate member will allow for the most ergonomic comfort during use of the auxiliary handle accessory.

In use, the auxiliary handle accessory is first attached to the handle of the shovel or the like and then adjusted in position angle and length. Different users will have different heights and different arm lengths, as well as different preferences of hand positions. Once set, however, the user will find the accessory to significantly relieve stress on the back and biceps, particularly when moving material from side to side. The accessory reduces torsion in the tool handle due to the "pendulum effect" when swinging the implement by providing additional mechanical advantage.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
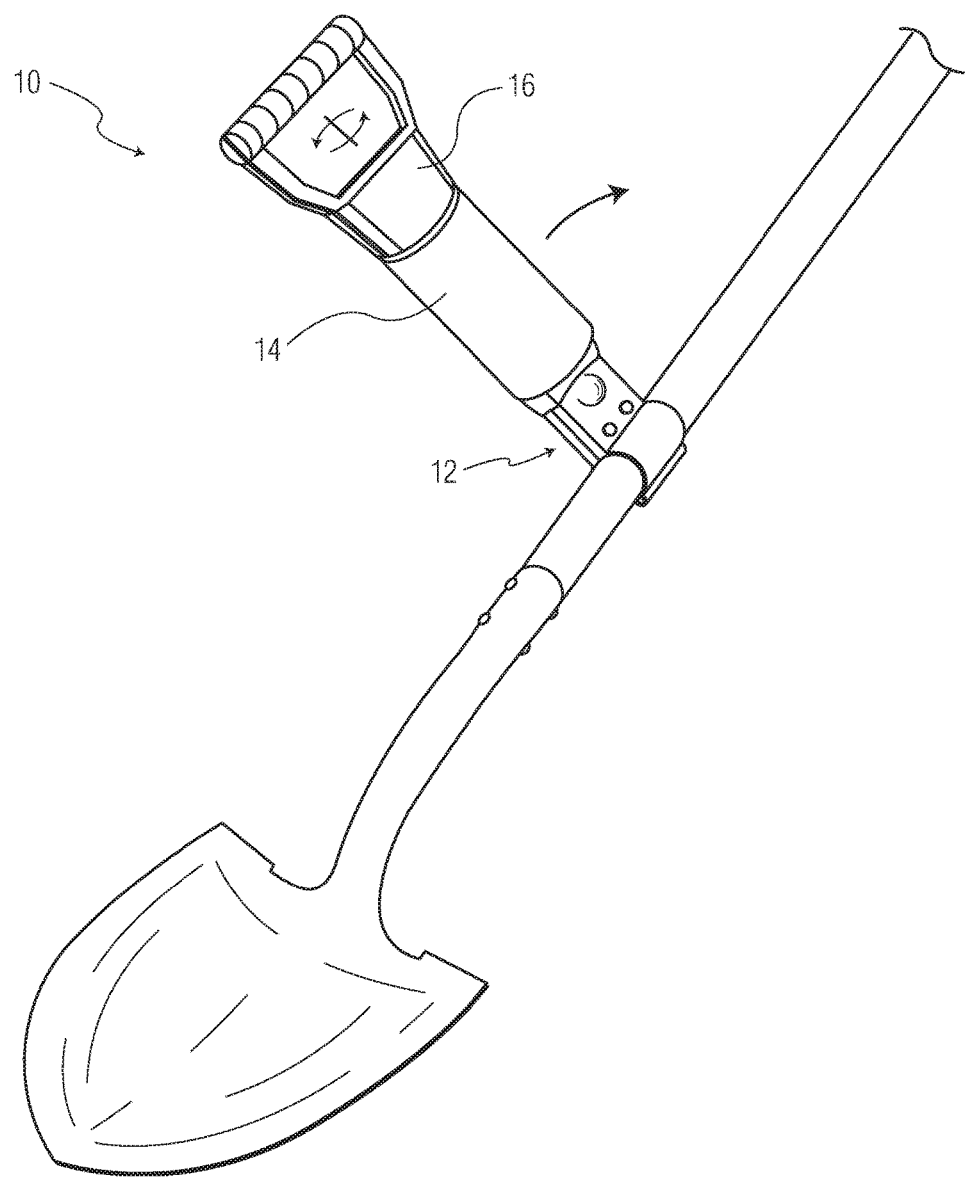
FIG. 1 is a perspective view of an auxiliary handle accessory according to the present invention, attached to the handle shaft of a shovel.

The preferred embodiments of the present invention will now be described with reference to FIGS. 1-6 of the drawings. Identical elements in the various figures are identified with the same reference numerals.

Briefly, the present invention provides an accessory for implement handles, pipes and hoses which, when attached, forms an elevated grip-handle that not only minimizes lower-back strain while bending at the waist, but also dampens the tendency of the shovel handle-shaft to twist when material is tossed to the side. This torsional effect forces the implement user to tighten his grip, eventually resulting in excess fatigue, muscle strain, cramps, etc. This is especially pronounced with wide-bladed "elbow" type snow shovels that tend to twist and swing like a pendulum.

The auxiliary handle accessory attaches to a shovel's handle-shaft via a folding "clamshell" type clamp, with an intermediate stem member attaching to the clamp, and a rotating grip handle screwing into this intermediate member, completing the assembly. The intermediate stem member has a ball-knob at the bottom that becomes entirely enclosed by half-sphere "cups" in each of the clamshell clamp halves. When these clamshell halves close together, they form a simple yet robust socket around the ball, and comprise a ball-and-socket joint. Advantageously, the clamshell clamp halves are bolted together, insuring a strong and robust connection. This design accommodates the "to-and-fro" motion in the vertical axis during shoveling.

The handle grip is screwed into the top of the intermediate stem and is hinged to rotate about a central axis of the stem to allow for the minor angular movement during shoveling.

The length of the intermediate stem may be adjusted, or the intermediate stem may be provided in different lengths to enable the user to select the length that best suits his/her height for ergonomic comfort.

FIG. 1 of the drawings illustrates the auxiliary handle accessory 10 when in use, attached to the handle of a shovel. The device comprises a "clamshell" clamp 12, an intermediate stem member 14 and a rotatable hand grip member 16. As may be seen, the accessory is conveniently clamped to the shovel handle-shaft at a point relatively close to the shovel scoop, allowing the user to lift a shovel-full of dirt, cement, snow or the like with one hand and arm while holding the top of the handle with the other, and pitch the load forward or sideways with a minimum of effort.

Figure 2:
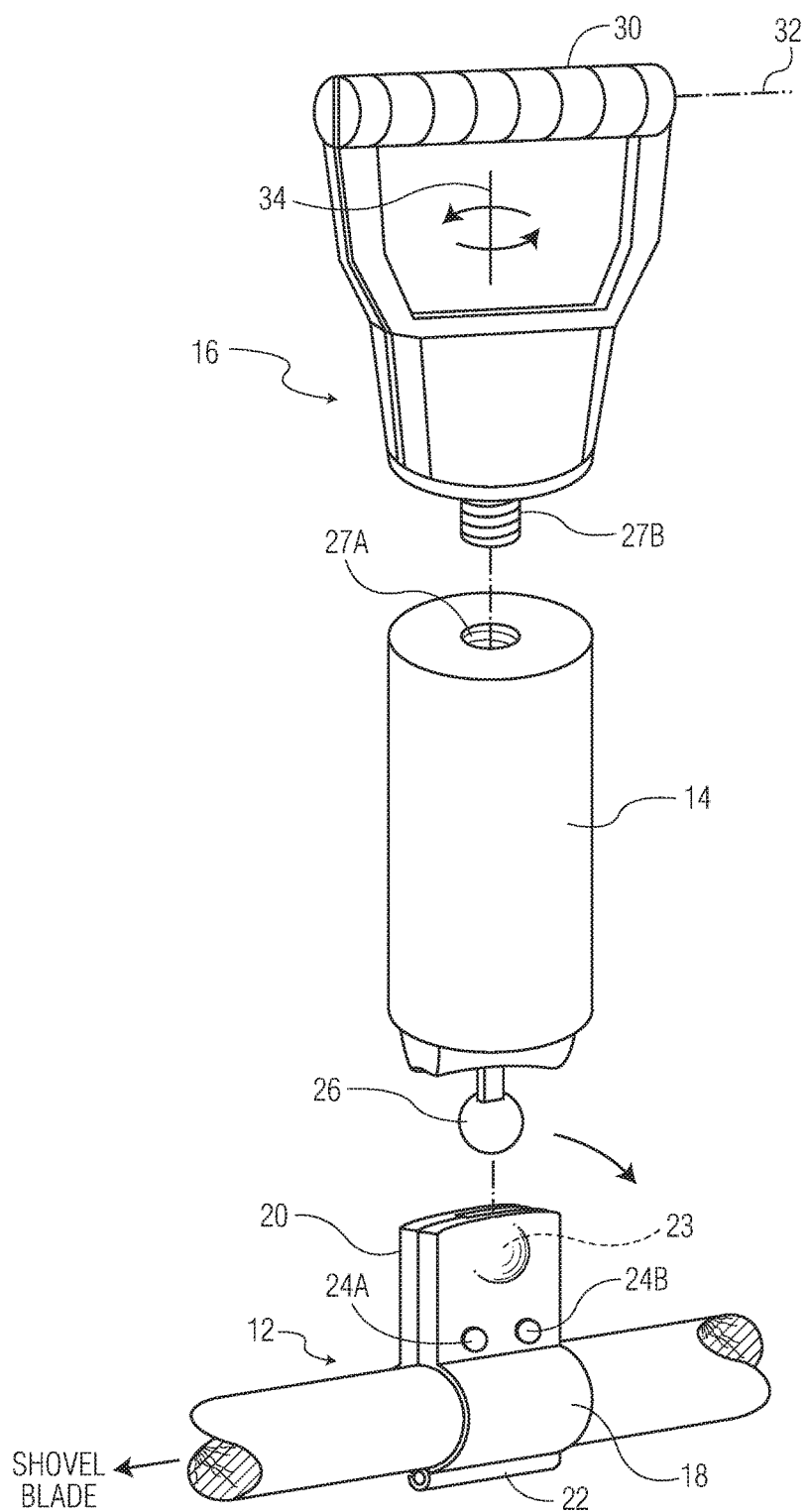
FIG. 2 is an assembly view of an auxiliary handle accessory according to a preferred embodiment of the present invention, showing its separate individual components, namely a clamping device with clamshell members, an intermediate stem member and a rotatable handle-grip.

FIG. 2 shows the clamp 12, the stem 14 and the gripping member 16 of the accessory 10 in detail. The clamp 12 is comprised of two substantially identical clamshell halves 18 and 20, held together at the bottom by a hinge 22. The clamshell members 18 and 20 have mating semi-circular sections designed to surround the handle-shaft of a tool (e.g., a shovel) and clamp tightly together for fixed attachment to the shaft. The clamshell members 18 and 20 each have a hemispherical indentation at their opposite end that forms a hollow sphere 23 when held together in the clamped position. The two clamshell members are held tightly together by releasable locking means, such as bolts 24A and 24B, that can release the clamshell members for removal from the tool or for repositioning the accessory on the tool handle shaft.

As shown in FIG. 2, the accessory further includes a removable handle having a spherical knob 26 at one end designed to fit snugly inside the hollow sphere 23 when the clamshell members are clamped tightly together. The handle is preferably constructed in two pieces:

(1) An intermediate stem member 14 comprising a rod with two ends, the spherical knob 26 being arranged at one end for attachment to the clamping device when the clamshell members are held tightly together. Connecting means, for example a threaded opening 27A, is provided at the opposite end of the stem member for attaching a gripping member 16.

(2) The gripping member 16 has cooperating connecting means, threaded bolt 27B, for attachment to the opposite end of the stem member 14.

The gripping member 16 comprises a substantially round rod 30 defining a central axis 32. The rod 30 is rotatable to permit angular movement about an axis 34 (i.e., the stem axis when the gripping and stem members are attached together) which is transverse to the central axis 32. This allows adjustment in the orientation of the handle for convenience of the tool user.

Figure 3A:
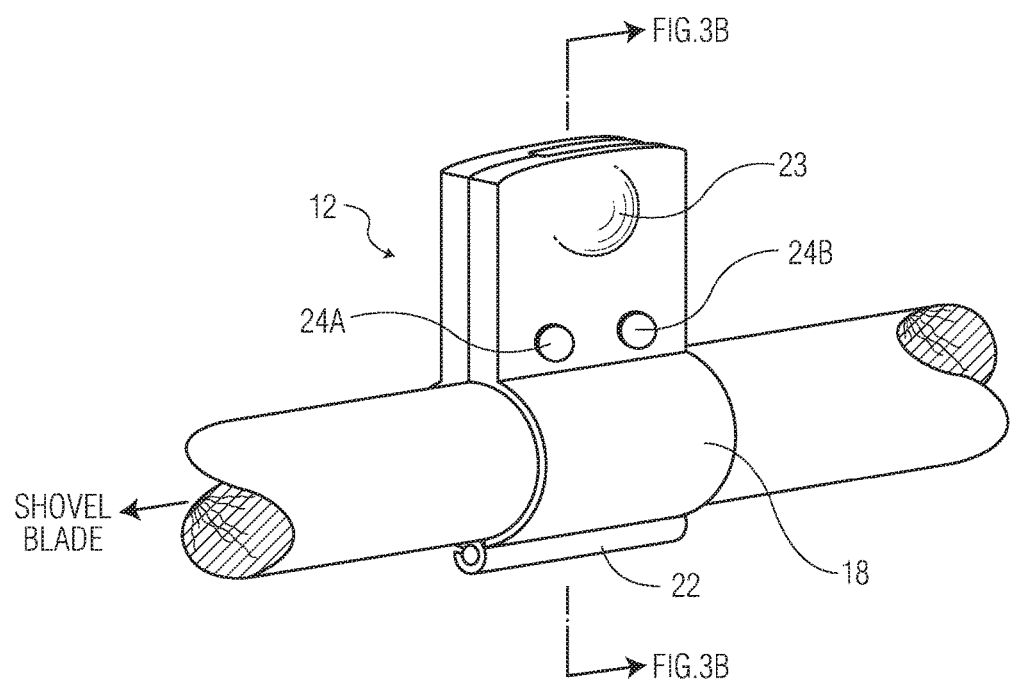
FIGS. 3A, 3B and 3C show in detail the clamshell members of the handle accessory of FIG. 2, in a closed, in a half-closed and in an open position, respectively.
Figure 3B:
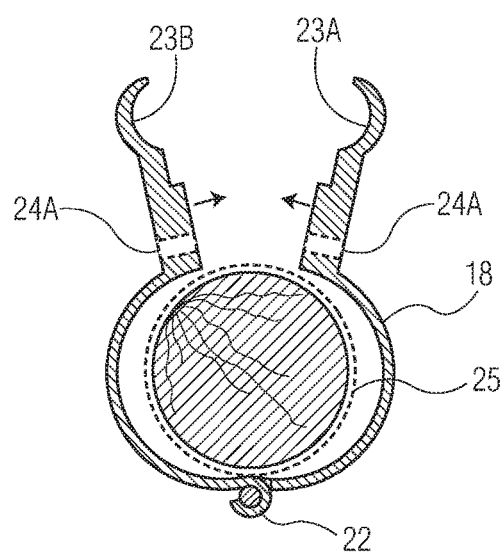
Figure 3C:
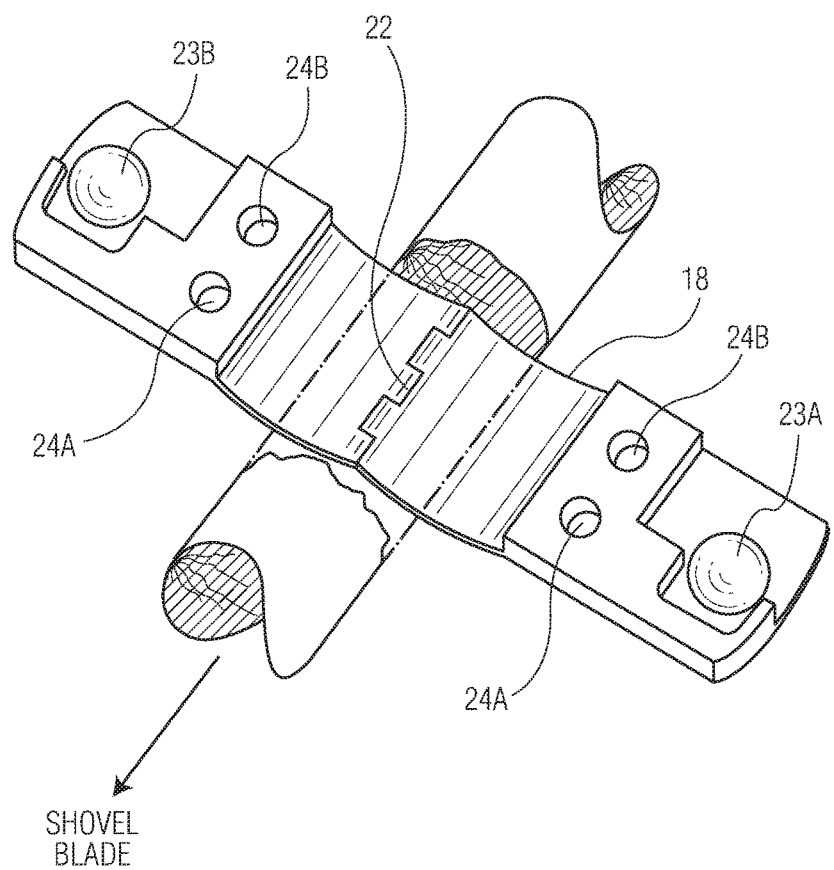

FIGS. 3A, 3B and 3C illustrate the clamshell clamping member 12 in a clamped, a partially open and a fully open position, respectively. These figures show details of the hinge 22 and the hemispherical "cups" 23A and 23B, and holes for the bolts 24A and 24B. In order to snugly clamp a slimmer handle-shaft, it may be desirable to insert a plastic or rubber gasket 25 between the clamshell clamping member 12 and the shaft.

Figure 5:
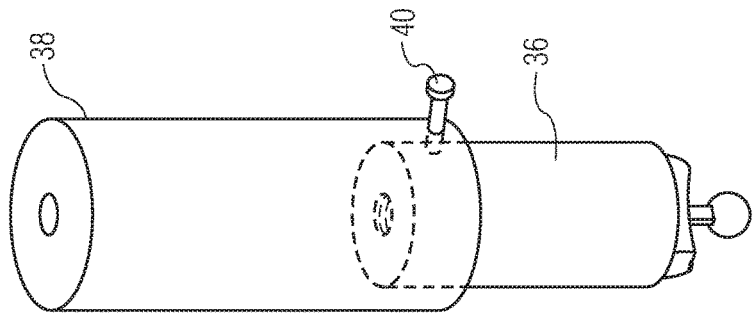
FIG. 5 shows an intermediate stem member of adjustable length, according to another preferred embodiment of the present invention.
Figure 4C:
FIGS. 4A, 4B and 4C show intermediate stem members of differing length with a ball-knob at one end, according to a preferred embodiment of the present invention.
Figure 4B:
Figure 4A:

The length of the stem member may be selected by the user, either by choosing one of a plurality of stem members of various lengths, as shown in FIGS. 4A, 4B and 4C, or by providing a length-adjustable stem member as shown in FIG. 5. In the embodiment of FIG. 5 the stem member includes a telescoping rod 36 and sleeve 38, and a locking bolt 40.

Figure 6:
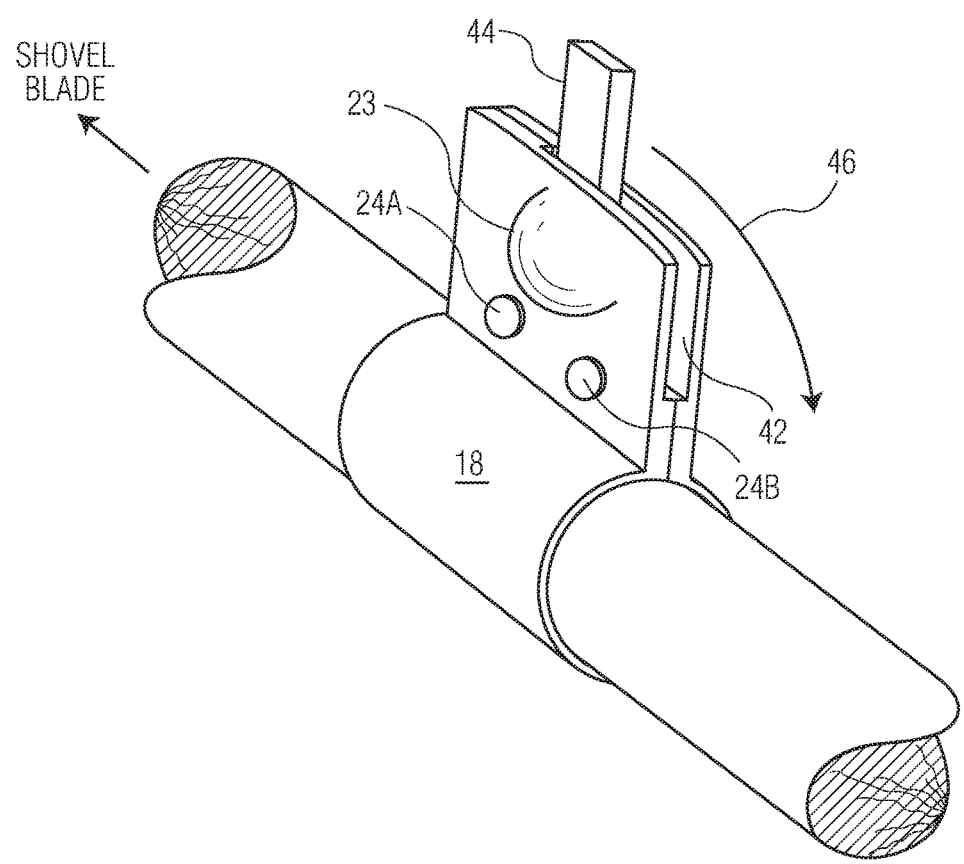
FIG. 6 is a perspective view, partly in phantom, of a clamshell clamp with a limiter groove, allowing for only fore and aft swing movement of the intermediate stem member.

Finally, FIG. 6 shows means for limiting the movement of the intermediate stem and handle with respect to the clamping member. The clamshell member is provided with a slot or groove 42, and the stem member 14 with an extending stud 44, designed to fit snugly in the groove. The groove 42 and the extending stud 44 cooperate to limit the freedom of movement of the handle device to the direction shown by the arrow 46, thereby enabling the user to control the shovel handle by applying a force in the desired direction.

When the tool with the attached handle accessory is not in use, the handle device can be moved downward in the direction of the arrow 46 to lay tightly adjacent, and parallel to, the tool handle-shaft. This minimizes the storage space required and makes the tool easier to carry.

There has thus been shown and described a novel auxiliary handle accessory for a shovel or pitch-fork which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An adjustable, auxiliary handle accessory, adapted for attachment to material-moving tool, for reducing stress on the tool user said handle accessory comprising, in combination:
   (a) a removable clamping device, adapted to clamp tightly around a cylindrical shaft handle portion of the tool, said clamping device including two substantially identical clamshell members hinged together at one end and having mating semi-circular sections designed to surround the shaft portion and clamp tightly together around the shaft portion for fixed attachment thereto, said clamshell members each having a hemispherical indentation at an opposite end thereof that form a hollow sphere when said clamshell members are held together in the clamped position, said clamping device further including releasable locking means for holding the two clamshell members tightly together in the clamped position and for releasing the clamshell members for removal from, or repositioning on, the tool;
   (b) a removable handle device having a spherical knob at one end designed to fit snugly inside the hollow sphere when the clamshell members are clamped tightly together around the shaft portion of the tool and having a gripping member at an opposite end designed to be conveniently gripped by a user;
   wherein the hollow sphere formed by the clamshell members includes a groove, and the spherical knob of the removable handle device has an extending stud, designed to fit in the groove, said groove and said extending stud cooperating to limit the freedom of movement of the handle device and thereby enable the user to control the tool by applying forces in desired directions.

2. The auxiliary handle accessory defined in claim 1, wherein said removable handle device comprises:
   (1) an intermediate stem member comprising a rod with two ends, said spherical knob being disposed at one end for attachment to the clamping device when the clamshell members are clamped tightly together around the shaft portion of the tool, and connecting means disposed at the opposite end thereof for attachment of a said gripping member;
   aid gripping member being designed to be conveniently gripped by a user and having cooperating connecting means for attachment to said opposite end of the stem member.

3. The auxiliary handle accessory defined in claim 2, wherein said connecting means on said stem member for connection to said gripping member include a threaded opening, in one of said stem member and said gripping member, and a threaded stud, in the other of said stem member and said gripping member, adapted to be screwed into said threaded opening.

4. The auxiliary handle accessory defined in claim 2, wherein said gripping member includes a substantially round rod having a central axis, said rod being rotatably coupled to said intermediate stem member to permit angular movement about an axis transverse to said central axis, thereby to allow adjustment in its orientation for convenience of the tool user.

5. The auxiliary handle accessory defined in claim 2, wherein the intermediate stem member is adjustable in length.

6. The auxiliary handle accessory defined in claim 1, wherein said releasable locking means on said clamping device include at least one bolt adapted to extend through a hole in said clamshell members when in the clamped position and a cooperating nut for securing the bolt on the clamping device and holding the clamshell members tightly together.

* * * * *